May 22, 1923.
A. SAVIGNAC
HAY COCKING MACHINE
Filed Sept. 12, 1921   3 Sheets-Sheet 3
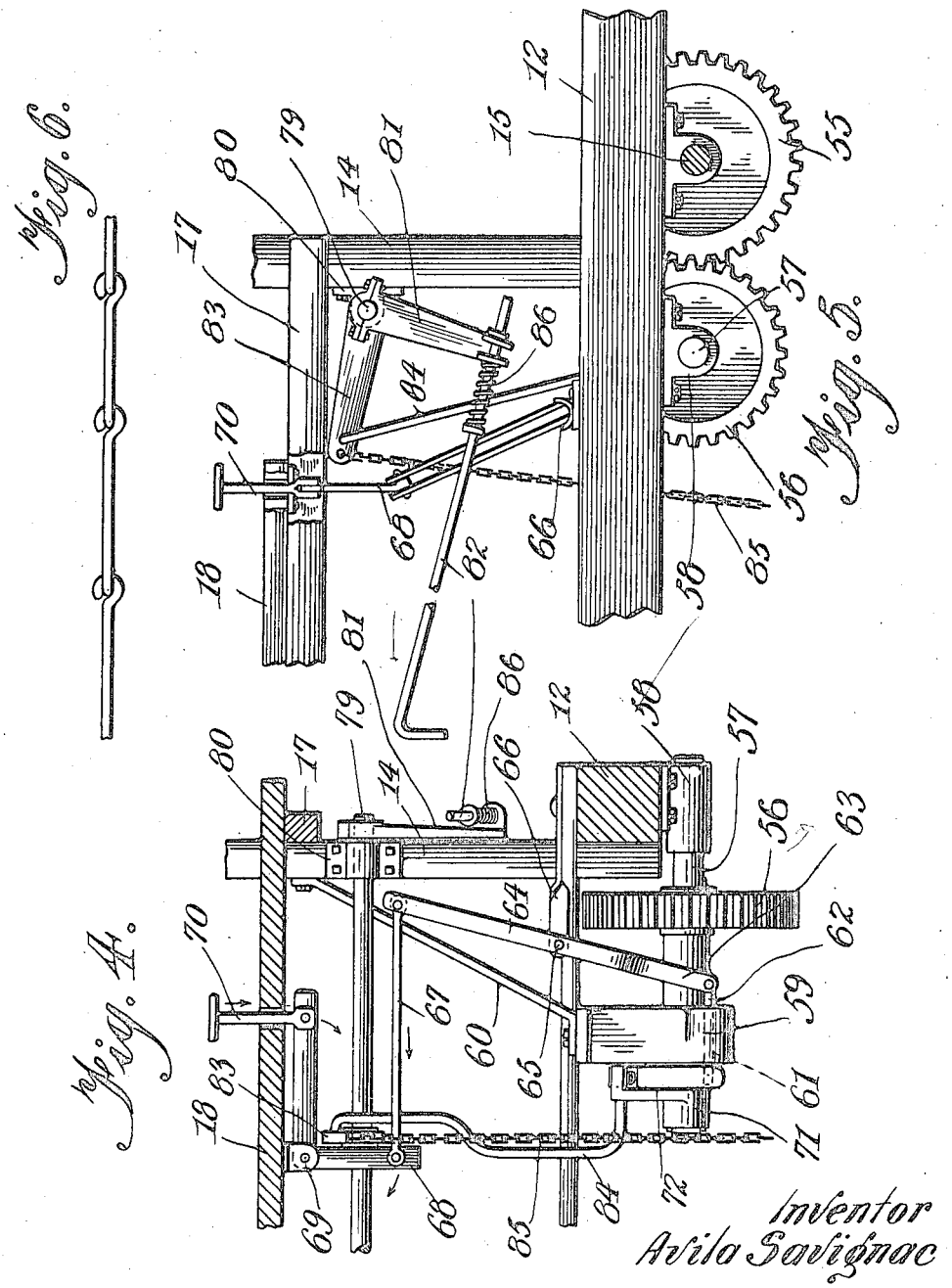
Inventor
Avila Savignac
By William Clinton
Attorney Patented May 22, 1923.

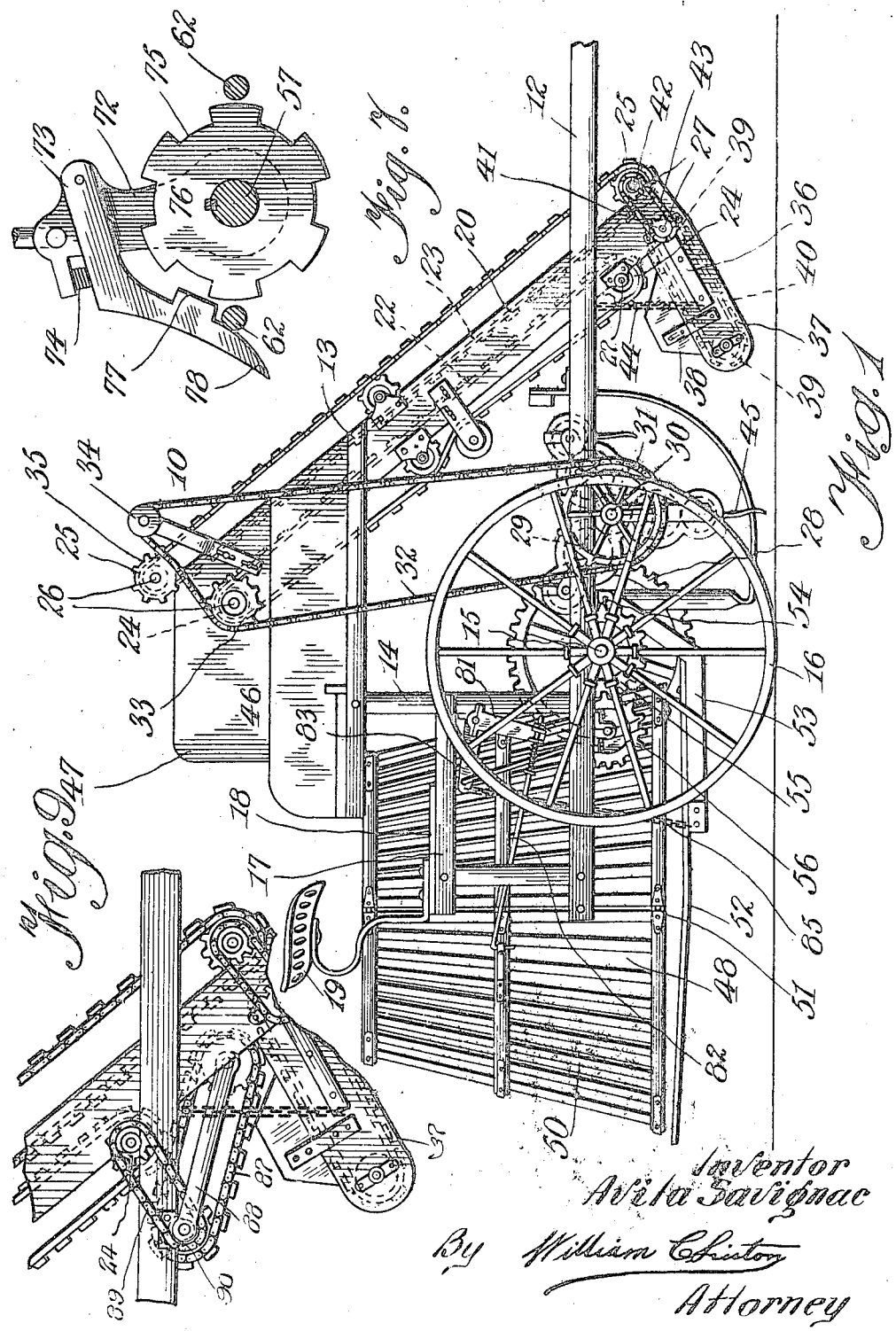

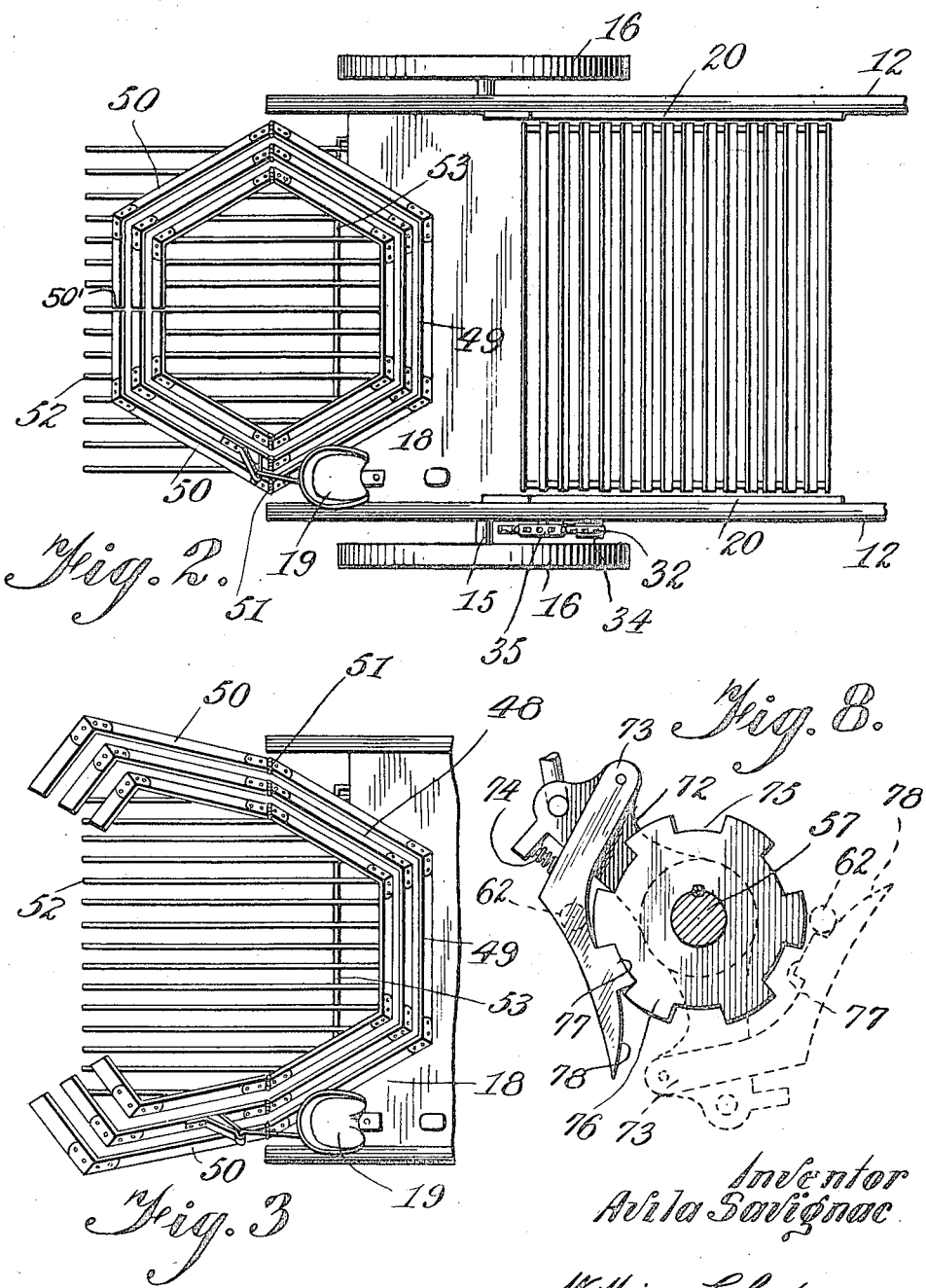

1,456,467

UNITED STATES PATENT OFFICE.

AVILA SAVIGNAC, OF JOLIETTE, QUEBEC, CANADA.

HAY-COCKING MACHINE.

Application filed September 12, 1921. Serial No. 500,174.

*To all whom it may concern:*

Be it known that I, AVILA SAVIGNAC, a subject of the King of Great Britain, residing at Joliette, Province of Quebec, Canada, have invented certain new and useful Improvements in Hay-Cocking Machines; and I do hereby declare that the following is a full, clear, and exact description of the invention, such as will enable others skilled in the art to which it appertains to make and use the same.

The present invention relates to new and useful improvements in hay cocking machines.

The primary object of the invention is the provision of a machine for forming hay cocks at intervals throughout a field.

Another object of the invention is the provision of a hay cocking machine in which a cock forming mechanism is provided together with means for lifting the hay from the ground and placing the same in the cock forming mechanism, and means for releasing the formed hay cocks and depositing them upon the ground from the machine.

Another object of the invention is the provision of novel mechanism including a rotary shaft and foot releasing treadle for operating the cock forming mechanism to deposit the hay upon the ground in cock formation and at desired intervals.

A further object of the invention is the provision of a machine of the character described including a wheeled frame having a cock forming mechanism mounted thereon, together with novelly constructed conveyers for picking the hay up from the ground and conveying it into the said cock forming mechanism.

A still further object of the invention is the provision of a machine of the character described, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawings forming a part of the present application, and in which:

Figure 1 is a side elevation of the invention;

Figure 2 is a top plan view thereof;

Figure 3 is a similar view of the rear of the machine showing the cock forming mechanism in releasing position;

Figure 4 is a detail sectional view illustrating in elevation the operating mechanism for actuating the cock forming mechanism;

Figure 5 is a view similar to Figure 4 showing a side elevation of said mechanism.

Figure 6 is a detail view of the chain.

Figure 7 is a view showing the operating latch in inoperative position;

Figure 8 is a similar view showing the same in operative position in full lines and in inoperative position in dotted lines; and, Figure 9 is a modified form of the invention in which a means is provided for feeding the hay to the lower conveyor.

Referring now to the accompanying drawings by corresponding characters of reference throughout the several views, the numeral 10 designates in general my improved hay cock forming machine which comprises a main frame 11 consisting of the lower side bars 12 and upper side bars 13, connected by the intermediate frame members 14.

A suitable axle 15 is journalled at underside of the frame members 12 and secured to the opposite ends thereof are the main supporting wheels 16.

Supplemental frames 17 are secured to the rear of the members 12 and 14 and support a suitable platform 18 near an end of which is mounted the driver's seat 19.

A pair of side plates 20 are secured to the frame members 12 and 13 respectively, slanting upwardly and rearwardly as shown in Figure 1 and between these plates 20 operate the inner laps of the conveyers 22 and 23 which are disposed in spaced parallel relation to each other.

These conveyers 22 and 23 pass over the drums 24 and 25 respectively, the drums at the upper ends being mounted on shafts 26, while those at the lower ends are mounted on shafts 27.

A gear 28 is keyed to the axle 15 and meshes with a gear 29 carried by stub shaft 30 supported by the frame members 12. A sprocket wheel 31 is likewise keyed to the shaft 30 and over the same is trained a sprocket chain 32 which passes over a sprocket wheel 33 secured to one of the said shafts 26 and over an idler 34. Obviously, upon the rotation of the wheel 16, power is imparted through the said chain 32 to the conveyer 22.

An additional sprocket wheel 35 is keyed to the other of the shafts 26 and engages the chain 32 whereby the proper movement will likewise be imparted to the conveyer 23 driving the same in an opposite direction to the conveyer 22, for a purpose which will be later explained.

A hinged frame 36 is pivotally connected to one of the shafts 27 and includes a pair of side plates 37 having upwardly extending guides 38 mounted thereon. A pair of drums 39 are journaled in opposite ends of the plates 37 and over these drums a conveyer 40 passes. A sprocket 41 is keyed to one of the shafts 27 while another sprocket 42 is keyed to the other of said shafts 27. A chain 43 connects the sprockets 41 and 42 and imparts a proper movement to the conveyer 40.

Chains 44 are secured to the opposite sides of the frame members 12, and are adjustably secured to the frame 36 whereby the conveyer 40 may be raised and lowered to and from the ground.

A suitable rake 45 is mounted upon the shaft 30 and obviously as the machine passes over the ground this rake will operate to pick up the hay throwing it on to the conveyer 40 from whence it will be carried upwardly between the inner laps of the conveyers 22 and 23 and deposited in the chute 46 mounted between the side plates 47 at the upper part of the machine.

The cock forming device is shown at 48 and is mounted between the supplemental frames 17. The same is hexagonal in plan view, comprising a front stationary portion 49 and a pair of hinged rear sections 50, separated as at 50', which are secured to the ends of the section 49, as shown at 51 for outward swinging movement from the position shown in Figure 2 to that of Figure 3.

This cock forming device as shown in Figures 1, 2 and 3 is tapered towards its upper end in order that the face of the cock may be larger than the upper end thereof.

A fork 52 is secured to arms 53 which are hinged at their upper ends as at 54 to the side members 12 and is movable to and from the base of the cock forming mechanism forming when in its raised position, as shown in Figure 1, a bottom closure therefor.

A gear 55 is keyed to the axle 15 adjacent to the gear 28 and meshes with a similar gear 56 keyed to the counter-shaft 57 mounted in a suitable bearing 58 secured to one of the side members 12 adjacent the axle 15.

The inner end of the shaft 57 is supported by a suitable bearing 59 supported by brackets 60. The opposite sides of the bearing 59 are provided with openings 61 through which locking pins 62 are operable.

The locking pins 62 are pivoted to the opposite sides 63 of a fork lever 64 pivoted as at 65 to a bracket 66 secured to a convenient portion of the machine.

The upper end of the fork lever 64 is connected by a link 67 to a bell crank lever 68 pivoted as at 69 to the underside of the platform 18. The upper arm of the bell crank lever 68 is connected to a foot treadle 70 located within the convenient reach of the operator who rides on the seat 19. A sleeve 71 is rotatably mounted upon the shaft 57 upon the inner side of the bearing 59 and has a laterally extending arm 72 which carries pivotally connected thereto a latch 73 which is forced by means of a spring 74 into engagement with the notches 75 of a disk 76 which is keyed to the shaft 57.

The latch 73 is provided with a locking lug 77 which engages the notches 75. The latch 73 is normally held in the position shown in Figure 7 by one of the pins 62 before mentioned and the arm 72 of the sleeve 71 remains stationary. The lever 64, as shown in Figure 4, is heavier at the portion above the pivot 65 than below the pivot. The construction of the linkage from the lever to the treadle is such that the lever is always inclined, and therefore tends to assume the position wherein the pins 62 are normally in the path of the lug 77.

A small shaft 79 is journaled in suitable bearings 80 secured to the uprights 14 and has secured to its outer ends arms 81. These arms are connected by means of links 82 to the opposite sections 50 of the cock forming mechanism.

An additional arm 83 is secured to the intermediate portion of the shaft 79 and is connected by a curved link 84 to the before described arm 72 so that upon the movement of the shaft 79, this arm 83 will be pulled downwardly causing the sections 50 of the cocking device to be moved to the open position as shown in Figure 3.

The arm 83 is likewise connected by means of the chain 85 to one of the arms 53 of the fork 52 so that the said arm 83 will move downwardly lowering the said fork through the instrumentality of the chain 85 and permitting the cocks to be deposited on the ground. For the purpose of illustrating the operation, let it be assumed that the disk 76 and latch 73 are in the position shown in Figure 7, the fork 52 closing the cock forming device 50 which is at this time disposed as shown in Figure 2. When the operator desires to empty the latter device, he presses on the treadle 70, whereupon the pins 62 are withdrawn from the latch and the tooth 77 is allowed to enter one of the notches 75. The disk 76 is constantly in rotation through the medium of gears 55 and 56. Consequently when the latch or lug 77 enters one of the notches the arm 84 is drawn downwardly to the position shown in Figure 8, whereupon the fork is allowed to drop and the cock forming device is spread, as shown in Figure 3. The operator then releases the treadle so that the pins return to their original position. When the latch is turned to the position shown in the dotted lines of Figure 8, it is stopped by the right hand pin 62, whereby the parts are retained in open position to allow the contents of the device 50 to be discharged. When the operator sees that the device has been open for a sufficient period of time he again presses the treadle to withdraw the pins 62 and to allow the lug 77 to engage in one of the notches 75. The latch 73 and arm 84 are now allowed to return to the upper position. The arm 84 in rising lifts the arm 83 as a consequence of which the fork 52 is raised and the cock forming device returned to the position shown in Figure 2. The operator now releases the treadle so that one of the pins 62 again enters the path of the latch to disengage the same from the notched disk. The mechanism is now ready for another cycle similar to that described.

Figure 9 is a modified form of invention in which a supplemented conveyor 87 is pivoted at its rear end in the side bars 88 and rests upon the hay or the like, fed upon the conveyor 40. This conveyor 87 is driven by a chain 89 which passes over the pulleys 90 and 24.

This conveyor 87 prevents the hay from either being blown from the conveyer 40 or dragged therefrom by the wheels 16.

It will be noted that there is a spring connection 86 between the arms 81 and links 82. This prevents any injury to the device in case there is hay caught between the ends of the sections 50 when the same is being closed and will allow a sufficient amount of play to prevent injury to any of the operating parts.

From the foregoing description taken in connection with the accompanying drawings, it will be manifest that a hay cocking machine is provided which will fulfill all of the necessary requirements of such a device.

Having thus fully described the invention, what I claim as new and desire to protect by Letters Patent is:—

1. In a machine of the character described, a wheeled frame, a hay cock mechanism mounted therein, including a pair of hinged sections, a rotatable shaft for opening said sections, and means for driving said shaft and causing the sections to be opened.

2. In a machine of the character described, the combination with a wheeled frame of a cock forming mechanism mounted upon said frame, a shaft, means for driving said shaft, said cock forming mechanism including a pair of hinged sections, and means cooperating with the axle for driving the shaft therewith and actuating said hinged sections.

3. In a machine of the character described, a wheeled frame, a cock forming mechanism carried by the frame, means for conveying hay or the like to said cock forming mechanism, said mechanism including a pair of hinged sections, a rotatable shaft, means for imparting motion thereto, and means cooperating therewith for driving the shaft at predetermined intervals for opening and closing the hinged sections.

4. In a machine of the character described, the combination of a wheeled frame, an axle journalled therein, means for rotatably connecting said axle with the driving mechanism of the machine, a shaft operatively connected to the axle, a cock forming mechanism mounted in the frame, said mechanism including hinged sections, means for operatively connecting the hinged sections with the shaft, and a treadle actuating mechanism for operatively connecting said shaft and axle.

5. The combination in a device such as described, of a wheeled frame, a cock forming mechanism mounted therein including hinged side sections, a fork covering the bottom of said cock forming mechanism, and means operatively connected to the driving means for lowering the fork and opening the side sections for depositing the cock upon the ground.

6. In a machine of the character described, the combination of a wheeled frame, a cock forming mechanism mounted therein, conveyers for depositing hay or the like in the cock forming mechanism, said cock-forming mechanism including hinged side sections and a movable bottom closure, mechanism for opening and closing the side sections and raising and lowering the bottom portion, and a treadle operating means for actuating said mechanism.

7. In a machine such as described, the combination of a wheeled frame, a cock forming mechanism mounted therein and including hinged side sections and a bottom closing fork, a conveyer for depositing hay or the like in the cock forming mechanism, a revolving rake for depositing the hay or the like into said conveyer, a rotatable shaft operatively connected to the driving mechanism and to the hinged side and bottom sections of the cock forming mechanism for operating the latter, and means for causing the operation of the shaft and the actuation of the side and bottom sections of the cock forming mechanism.

8. The combination in a machine such as described of a wheeled frame including a rotatable axle, a cock forming mechanism, and means operatively connected to the rotatable axle for depositing a cock from said cock forming mechanism upon the ground.

9. The combination in a machine of the character described, of a wheeled frame, a cock forming mechanism mounted on said frame, a rotatable driving axle, a shaft operatively connected thereto for rotation, means operated by the rotatable shaft for depositing a hay cock from the cock forming mechanism upon the ground, and means for operatively connecting the means for depositing the hay cock upon the ground with said shaft at desired intervals.

10. In a machine of the character described, the combination of a wheeled frame, an axle rotatable in said frame, a shaft rotatably connected with said axle, a disk having notches therein secured to the shaft and rotatable therewith, an arm loosely mounted upon the shaft, means for normally holding the arm out of engagement with the notches in the disk, a treadle actuated mechanism for connecting the arm with the disk and causing the rotation of the arm with shaft, a cock forming mechanism mounted in the frame, and means for discharging the cock from the mechanism operatively connected to the arm.

11. In a machine of the character described, the combination of a wheeled frame, a rotatable axle journalled in the frame, a cock forming mechanism mounted in said frame, means for discharging a cock from said cock forming mechanism, means for depositing hay or the like in the cock forming mechanism, a shaft rotatably connected to the axle, a disk carried by the shaft and rotatable therewith, an arm loosely mounted upon the shaft, a pawl carried by the arm for engaging the notches in the disk and causing the rotation of the arm with said shaft, means for releasing the pawl whereby the latter will engage the notches in the disk, and an operative connection between the arm and the cock forming mechanism whereby the cock will be discharged from said cock forming mechanism.

12. In a machine of the character described the combination of a wheeled frame, a cock forming mechanism mounted therein, a rotatable axle mounted in the frame, an operative shaft rotatably connected with said axle, means for depositing hay or the like in the cock forming mechanism, a disk having notches therein keyed to the shaft, an arm mounted upon the shaft and loosely connected thereto, a pawl carried by the arm for engagement with the notches in the disk, whereby when said pawl is in engagement with the disk, the arm will be rotated by the shaft, pins positioned adjacent the disk for normally holding the pawl out of engagement therewith and for releasing the pawl from the notches in the disk when the arm has made a predetermined movement, means operatively connecting the arm with the cock forming mechanism for discharging the cock from the same upon the proper movement of the arm, and means for actuating the pins to release the pawl for moving the arm and actuating the cock forming mechanism and also for moving the pins to return the arm to normal position.

In witness whereof I have hereunto set my hand.

AVILA SAVIGNAC.

Witnesses:
SATTME BEAUDOIN,
GEORGETTE LE BEAUDOIN.